Patented Nov. 30, 1937

2,100,714

UNITED STATES PATENT OFFICE 2,100,714

RUBBER COMPOSITION AND METHOD OF MAKING THE SAME

Glen S. Hiers, Bala-Cynwyd, Pa., assignor to Collins & Aikman Corporation, Philadelphia, Pa., a corporation of Delaware No Drawing. Original application November 2, 1933, Serial No. 696,386. Divided and this application July 31, 1934, Serial No. 737,768

9 Claims. (Cl. 18—50)

My invention is an improved method of producing rubber products, and the products resulting therefrom, and it relates primarily to the diminution of the tackiness of surfaces of unvulcanized rubber and the prevention of the oxidation thereof.

My invention is particularly designed to render practicable the utilization of unvulcanized rubber as a binder forming a bed or layer in a textile ground for securing pile thereto as set forth in my application Serial No. 696,386, whereof the present application is a division.

Such bed or layer does not impair the textile feel of the product for it does not obliterate the tips of the pile bights, but on the contrary is broken up by such bights and the ground yarns or fibres into minute areas or particles which are too small to tightly adhere together or to other objects when the surfaces thereof are provided, in accordance with my invention, with a "bloom" of waxy anti-tack material, which material, however, does not effect coagulation of the rubber from aqueous dispersions thereof.

To provide a uniform degree of "bloom", I effect the uniform dissemination of a waxy anti-tack material as a dispersed phase in the water of an aqueous dispersion of rubber directly by means of heat, as opposed to disseminating the waxy material in a vehicle by grinding or the like, and subsequently facilitate or augment by heat the blooming of the anti-tack material to the surface of the rubber which is solidified otherwise than by the action of the waxy material. I also utilize the anti-tack material as a vehicle for dispersing in the rubber a compounding ingredient or ingredients, such as anti-oxidizing materials which are liquefiable by heat and/or soluble in the vehicle and form therewith a stable liquid mixture. The vehicle comprises a non-aqueous and water immiscible substance which is not a solvent for rubber and is a solid or semi-solid at room temperatures. Such vehicle is liquefiable or fusible by heat and is used in sufficient quantity to render it incompatible with the rubber after the latter is coagulated, for example, by evaporation of the watery constituent of an aqueous dispersion of rubber.

The exudation of the waxy anti-tack material toward the surface of the rubber layer carries with it the anti-oxidizing material dissolved therein to the portion of the rubber most susceptible to oxidation and produces an unvulcanized rubber product having a non-tacky surface resulting from a bloom of waxy material on the rubber surface sufficient to neutralize the inherent tackiness of the rubber constituent.

In accordance with my invention I heat an aqueous dispersion of rubber, such as stabilized latex or a latex having globules coalesced into minute grains, or an artificial dispersion of previously coagulated rubber, to a temperature above the solidification point of a non-aqueous, water-immiscible anti-tack material liquefiable by heat preferably at a temperature below, or not substantially above, the boiling point of the aqueous dispersion of rubber. Such material is solid or semi-solid at ordinary room temperature. Preferably, I dissolve or disseminate in such anti-tack material, an anti-oxidant which is liquefiable by heat separately or in the anti-tack vehicle at a temperature below or not substantially above the boiling point of the aqueous dispersion of rubber.

The liquid solution, or colloidal dispersion, formed by the admixture of the anti-tack vehicle and the anti-oxidant is dispersed, while liquefied by heat, in the heated aqueous dispersion of rubber and forms a dispersed phase in the water thereof without coagulating or solidifying the rubber constituent. The heat-liquefied solution is preferably added slowly with gentle agitation to the heated aqueous dispersion of rubber and is thoroughly dispersed therein before the cooling of the compound begins to cause solidification of the added ingredients in minute particles which are thoroughly dispersed among the rubber globules in an aqueous dispersion.

When such a rubber compound is applied in liquid form to a textile fabric or the like, it penetrates into the yarns and the interstices between them to form a bed or layer which lies principally below the tips of the bights of the yarns and is composed of minute particles or areas. As the rubber coagulates or precipitates from the water, the anti-tack material, together with the anti-oxidant dissolved therein, moves towards the surface of the rubber and forms a "bloom" which neutralizes the tackiness of the rubber and prevents adhesion of laminations of the fabric together or to other objects in dyeing and finishing or use.

The solidification of the rubber and the exudation to the surface thereof of the ingredients dispersed therein is preferably facilitated by running the fabric, while permeated with the aqueous mixture of rubber globules, anti-tack vehicle and anti-oxidant, through a drier heated to a temperature above the liquefaction or fusion point of the anti-tack material, but below the fusion point of rubber, prior to dyeing and finishing. But, if desired, the rubber with the anti-tack vehicle and anti-oxidant may be separated from the water and solidified by air drying or by means of a weak acid bath, such for instance as a hot acid dye bath used for dyeing of animal fibres, of which the pile in the fabric is preferably composed.

A wide variety of heat liquefiable waxy anti-tack materials are suitable for use in the practice of my invention, and if desired several such materials may be combined to form a vehicle for an anti-oxidant miscible therewith when liquefied by heat. Likewise, various anti-oxidants may be used, and such anti-oxidants may be dissolved or dispersed in the liquefied vehicle at a temperature above the boiling point of the aqueous dispersion of rubber, and the compound cooled to a temperature at which it is still fluid and emulsifiable but below the boiling point of the aqueous dispersion of rubber before dispersion of such compound as a dispersed phase in water. Whether true solutions or colloidal suspensions or composite or multi-phase emulsions result from such admixtures is at present undeterminable with certainty, and the step of disseminating such substances may therefore be designated dispersing them, but the product is an aqueous dispersion containing rubber globules uncoagulated by the waxy material or by the anti-oxidant.

Among the waxy, waxlike or resinous vehicles which are liquefiable by heat, solidifiable in a suitable temperature range of say 60 degrees to 100 degrees centigrade, have a specific gravity below that of rubber or aqueous dispersions of rubber, are solvents or dispersing vehicles for compounding ingredients such as anti-oxidants and may be used to produce a stable liquid dispersion are candelilla, Montan, and carnauba wax, paraffin, chlorinated paraffin, ceresine, beeswax, glyceryl stearate, cumar, stearic acid, ozokerite, China wax, polychlorinated paraffins and naphthalenes (such as Halowax) and spermaceti.

As anti-oxidants I have satisfactorily used phenylbetanaphthylamine (commonly known as Neozone D) or phenylalphanaphthylamine (commonly known as Neozone A).

In some instances it may be desirable to improve the solvent quality of the anti-tack material and to facilitate emulsification thereof in the water of the rubber dispersion. To this end, a water immiscible non-aqueous solid or semi-solid solvent for the waxy anti-tack material and for the anti-oxidant may be mixed therewith to facilitate the thorough dissemination and admixture of the substances. Aromatic hydrocarbons or chlorinated hydrocarbons such as diphenyl, chlorinated diphenyl, paradichlorbenzene and naphthalene are suitable auxiliary solvents or blending agents in which the waxy materials and anti-oxidants are soluble, and which tend to facilitate emulsification of the mixture in the heated aqueous dispersion of rubber without coagulating the rubber globules thereof.

Chlorinated paraffins and naphthalenes, marketed commercially under the name Halowaxes, such as Halowax 1012; chlorinated diphenyls marketed commercially under the name Arachlors, such as Arachlors 4465 and 1269, and diphenyl are particularly useful as auxiliary solvents or blending agents.

Emulsifications of the heated liquefied mixture of anti-tack material and anti-oxidants to form a stable liquid mix may be further facilitated or augmented by the use of soaps or soap-forming materials. For instance, we may form an emulsifying soap by using in the heat liquefied mixture a waxy material containing an organic acid, for instance stearic acid, which will react with an alkaline material, for instance triethanolamine, contained in or added to the heated aqueous dispersion of rubber in which the heat liquefied mixture is dispersed.

As an illustration of a suitable formula for the practice of my invention, the following example is given, viz:

Melt and mix together at a temperature of about 85° C. 5 grams of phenylbetanaphthylamine, 5 grams of stearic acid, 45 grams of candelilla wax, and 15 grams of chlorinated paraffin melting below 100° C., for example, Halowax 1012. When these ingredients are thoroughly liquefied and commingled, they may be gently stirred while still liquid, into about 1300 grams of latex containing from thirty to forty per cent of rubber solids, and to which has been previously added 3 grams of triethanolamine; the latex having a temperature of say 90° C. If the original latex had a content of 35% rubber solids, there results a liquid emulsion having a total solids content of 38.4% and the anti-tack materials are present to the extent of 14.2% of the rubber solids. On cooling, the anti-tack material and the anti-oxidant dissolved therein are retained as a stable dispersed phase in the water of the aqueous dispersion of rubber, and should any precipitation or separation occur it may be readily dispersed as a dispersed phase by gentle agitation.

This rubber compound is particularly adapted for spreading upon, and partial absorption into, a pile fabric having animal fibre V-pile which is anchored to the ground of the fabric by the rubber compound which on coagulation forms a layer or bed in the ground which is preferably broken up into small areas by the interlacing of the ground threads and the pile bights projecting from the ground. The fabric with the anchoring material therein is run through a drier which facilitates and augments the "blooming" of the anti-tack material containing the anti-oxidant to the surface of the rubber particles. The "blooming" of the anti-tack material, the subdivision or breaking of the surface of the layer of the compound into small particles, and the protective projections formed by the protruding ends or points of pile bights result in a back which is substantially tack-free and non-adherent notwithstanding the absence of vulcanizers. The pile yarns and ground yarns are securely bound together without obliterating the textile feel or roughness resulting from the projection of the tips of pile bights or the interlacing of the pile yarns, and the treated fabric may be dyed without subjecting the dye to the effect of vulcanizers.

Having described my invention, I claim:

1. In the manufacture of an unvulcanized rubber product having a non-tacky surface, the steps which consist in dispersing directly a sufficient quantity of liquid waxy material as a dispersed phase in the water of an aqueous dispersion of rubber to form a bloom on the surface of the rubber coagulated therefrom neutralizing the inherent tackiness of the rubber constituent, said waxy material forming with the rubber dispersion a liquid mix having wax as a dispersed phase requiring further treatment for the coagulation of rubber therefrom.

2. In the manufacture of an unvulcanized rubber product having a non-tacky surface, the steps which consist in dispersing directly a sufficient quantity of a liquid waxy material as a dispersed phase in the water of an aqueous dispersion of rubber to form a substantially stable liquid mix having wax as a dispersed phase and to produce a bloom on the surface of the rubber subsequently coagulated therefrom neutralizing the inherent tackiness of the rubber constituent, and facilitating the surface blooming of such waxy material by subjecting the rubber product to a temperature at which the waxy material becomes fluid.

3. In a method of dispersing compounding ingredients as dispersed phases in the water of an aqueous dispersion of rubber, the steps which consist in liquefying one of said ingredients by heat, disseminating another of said ingredients in said liquefied ingredient, heating an aqueous dispersion of rubber to a temperature above the solidification point of said liquefied ingredient, and dispersing said ingredients as dispersed phases in the water of said aqueous dispersion of rubber, the rubber particles and dispersed ingredients retaining their dispersed condition in water after the dispersion of said ingredients.

4. In a method of compounding rubber, the steps which consist in liquefying by heat a waxy anti-tack material, dispersing an anti-oxidant through said liquefied material, heating an aqueous dispersion of rubber to a temperature above the solidification point of said waxy material, and dispersing said anti-tack material and anti-oxidant as dispersed phases in the water of said heated aqueous dispersion of rubber, the rubber particles and waxy material retaining their dispersed condition in water after the dispersion of said dispersed phases.

5. In a method of compounding rubber, the steps which consist in liquefying by heat a waxy anti-tack material, dispersing an anti-oxidant through said liquefied material, heating an aqueous dispersion of rubber to a temperature above the solidification point of said waxy material, and dispersing said anti-tack material and anti-oxidant as a complex phase in the water of said heated aqueous dispersion of rubber, the rubber particles and anti-tack material retaining their dispersed condition in water after the dispersion of said composite phase.

6. In the art of dispersing ingredients in rubber products, the steps which comprise liquefying by heat a vehicle and an anti-oxidant and dispersing and retaining the liquefied substance as a dispersed phase in a continuous phase comprising the water of an aqueous dispersion of rubber having a temperature above the solidification point of said liquefied substance.

7. In the manufacture of an unvulcanized rubber product having a non-tacky surface, the steps which consist in dispersing directly a sufficient quantity of liquid waxy material which is not a solvent for rubber as a dispersed phase in the water of an aqueous dispersion of rubber to form a bloom on the surface of the rubber coagulated therefrom neutralizing the inherent tackiness of the rubber constituent, said waxy material forming with the rubber dispersion a liquid mix having wax as a dispersed phase requiring further treatment for the coagulation of rubber therefrom.

8. In a method of compounding rubber, the steps which consist in liquefying by heat a waxy anti-tack material, heating an aqueous dispersion of rubber to a temperature above the solidification point of said waxy material, and dispersing said anti-tack material as a dispersed phase in the water of said aqueous dispersion of rubber, the rubber particles and waxy material retaining their dispersed condition in water after the dispersion of said dispersed phase.

9. In a method of compounding rubber, the steps which consist in liquefying by heat a waxy anti-tack material, heating an aqueous dispersion of rubber to a temperature above the solidification point of said waxy material, and dispersing said anti-tack material directly as a dispersed phase in the water of said aqueous dispersion of rubber, the rubber particles and waxy material retaining their dispersed condition in water after the dispersion of said dispersed phase.

GLEN S. HIERS.